(12) United States Patent
Athas et al.

(10) Patent No.: US 8,907,638 B2
(45) Date of Patent: Dec. 9, 2014

(54) RESONANT-RECOVERY POWER-REDUCTION TECHNIQUE FOR BOOST CONVERTERS

(75) Inventors: William C. Athas, San Jose, CA (US);
P. Jeffrey Ungar, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 622 days.

(21) Appl. No.: 13/152,188

(22) Filed: Jun. 2, 2011

(65) Prior Publication Data
US 2012/0306463 A1    Dec. 6, 2012

(51) Int. Cl.
*H02M 3/158*     (2006.01)
*H02M 1/34*      (2007.01)
*H02M 1/00*      (2006.01)

(52) U.S. Cl.
CPC .......... *H02M 3/1588* (2013.01); *Y02B 70/1491* (2013.01); *H02M 2001/346* (2013.01); *H02M 2001/0058* (2013.01); *Y02B 70/1425* (2013.01); *Y02B 70/1466* (2013.01)
USPC .......................................... 323/222; 323/282

(58) Field of Classification Search
USPC ........................... 323/222, 223, 282, 283, 285
See application file for complete search history.

(56) References Cited

U.S. PATENT DOCUMENTS

| | | | |
|---|---|---|---|
| 6,028,418 A * | 2/2000 | Jovanovic et al. | 323/222 |
| 8,320,144 B2 * | 11/2012 | Lee | 363/89 |
| 2007/0247121 A1 * | 10/2007 | Wu et al. | 323/222 |
| 2008/0012545 A1 * | 1/2008 | Komiya | 323/282 |
| 2008/0157742 A1 * | 7/2008 | Martin et al. | 323/284 |
| 2009/0237051 A1 * | 9/2009 | Saitoh | 323/282 |
| 2009/0302814 A1 * | 12/2009 | Kapels et al. | 323/282 |
| 2012/0200268 A1 * | 8/2012 | Ye et al. | 323/210 |

OTHER PUBLICATIONS

Qiao, Chongming, et al. (2005). "Control of Boost type Converter in Discontinuous Conduction Mode by Controlling the Product of Inductor Voltage-Second." International Rectifier. Presented at PESC 2005, Recife, Brazil. Obtained online at: http://www.irf.com/technical-info/whitepaper/pesc2005_controlofboostconverter.pdf.*

* cited by examiner

*Primary Examiner* — Fred E Finch, III
(74) *Attorney, Agent, or Firm* — Park, Vaughan, Fleming & Dowler LLP

(57) ABSTRACT

The disclosed embodiments relate to a power converter system. This power converter system includes an inductor which is coupled between an input that receives an input voltage $V_{in}$ and a peaking node. The system also includes a low-side switch and a high-side switch, wherein the low-side switch is coupled between the peaking node and a base voltage, and the high-side switch is coupled between the peaking node and an output that produces an output voltage $V_o$. The system additionally includes a controller which cycles the low-side switch between on and off states with a cycle time $T_{cycle}$. During the on state, the inductor current can flow through the low-side switch to the base voltage, and during the off state, the inductor current can flow through the high-side switch to the output. Moreover, during the off state, the controller waits to turn on the low-side switch until the inductor current $I_L$ decreases from a peak current $I_{pk}$ to zero and then goes negative. This negative inductor current resonantly discharges power through the input, wherein at least some of the resonantly discharged power is recovered after the low-side switch is turned on.

24 Claims, 5 Drawing Sheets

RESONANT-RECOVERY POWER-REDUCTION TECHNIQUE FOR BOOST CONVERTERS

BACKGROUND

1. Field

The disclosed embodiments relate to power converters. More specifically, the disclosed embodiments relate to a resonant-recovery technique for reducing power consumption in boost converters.

2. Related Art

Power efficiency is essential for the effective operation of portable computing devices, such as laptop computers or smartphones. One source of power dissipation is the "boost converters," which are commonly used to convert a battery voltage to higher voltage. This higher voltage can be used, for example, to power light emitting diodes (LEDs) that provide illumination for liquid crystal displays (LCDs) in portable computing devices.

There are a number of contributors to power dissipation in boost converters. "Conduction losses" arise from alternating current (AC) resistances and direct current (DC) resistances in the inductor and the associated switching devices within the boost converter. Note that there exists a tradeoff between AC and DC conduction losses, and these conduction losses can be jointly minimized by adjusting system parameters, such as operating frequency, MOSFET on resistance ($R_{on}$) and inductor characteristics of the boost converter.

Another source of power dissipation arises from the "switching losses," which result from charging and discharging the internal capacitances within the boost converter. These switching losses can dissipate a significant amount of power, particularly so after the AC and DC conduction losses have been carefully balanced.

Hence, what is needed is a method and an apparatus for reducing such switching losses in a boost converter.

SUMMARY

The disclosed embodiments relate to a power converter system. This power converter system includes an inductor which is coupled between an input that receives an input voltage $V_{in}$ and a peaking node. The system also includes a low-side switch and a high-side switch, wherein the low-side switch is coupled between the peaking node and a base voltage, and the high-side switch is coupled between the peaking node and an output that produces an output voltage $V_o$. The system additionally includes a controller which cycles the low-side switch between on and off states with a cycle time $T_{cycle}$. During the on state, the inductor current can flow through the low-side switch to the base voltage, and during the off state, the inductor current can flow through the high-side switch to the output. Moreover, during the off state, the controller waits to turn on the low-side switch until the inductor current $I_L$ decreases from a peak current $I_{pk}$ to zero and then goes negative. This negative inductor current resonantly discharges power through the input, wherein at least some of the resonantly discharged power is recovered after the low-side switch is turned on.

In some embodiments, the controller waits to turn on the low-side switch until a voltage $V_{pk}$ at the peaking node is as close as possible to zero. At this switching point, $I_L = -I_{max} \sin(\delta)$, wherein $\delta$ is a phase angle for a resonant cycle time associated with the resonant discharging, wherein $$I_{max} = \sqrt{\frac{C_{pk}}{L}} (V_o - V_{in}),$$

wherein L is the inductance of the inductor, and wherein $C_{pk}$ is a total capacitance at the peaking node.

In some embodiments, the low-side switch is a transistor.

In some embodiments, the high-side switch is a transistor. In these embodiments, after the controller turns off the low-side switch, the controller waits for a non-overlapping time interval to transpire before turning on the high-side switch, wherein the non-overlapping time interval allows a voltage on the peaking node $V_{pk}$ to ramp up to $V_o + V_{drop}$, wherein $V_{drop}$ is a voltage drop through the high-side switch. ($V_{drop}$ will be very small or close to zero if the high-side switch is a FET, and will be larger if the high-side switch is a diode.) Next, the controller waits until $I_L$ decreases toward zero before turning off the high-side switch.

In some embodiments, the high-side switch is a diode with a forward voltage drop $V_{drop}$, wherein the diode turns on when a voltage on the peaking node reaches $V_o + V_{drop}$.

In some embodiments, the controller is configured to dynamically update the cycle time $T_{cycle}$ and the resonant-recovery time $t_{rrc}$ based on changing values for the output current $I_o$ and $V_{in}$, wherein the resonant-recovery time $t_{rrc}$ is a time interval between when the high-side switch is turned off and the low-side switch is turned on.

In some embodiments, the system additionally includes a capacitive filter coupled to the output to reduce output voltage ripple.

In some embodiments, the input is coupled to a battery.

BRIEF DESCRIPTION OF THE FIGURES

Table 1 illustrates a number of components of power dissipation for different inductance values and associated frequencies in accordance with the disclosed embodiments.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Boost Converter

Figure 1A:
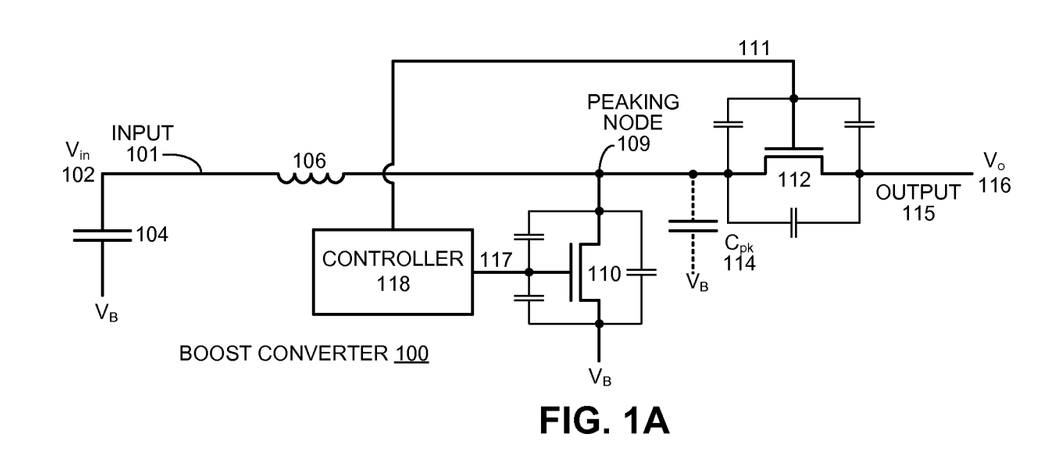
FIG. 1A presents a circuit diagram illustrating a boost converter that uses a transistor to implement the high-side switch in accordance with the disclosed embodiments.

FIG. 1A presents a circuit diagram illustrating a boost converter 100 that uses a field-effect transistor (FET) to implement a high-side switch 112 in accordance with the disclosed embodiments. The boost converter 100 illustrated in FIG. 1A includes an inductor 106, which is coupled between an input 101 (that receives an input voltage $V_{in}$ 102) and a peaking node 109. Note that input 101 is also coupled to an input capacitance 104. Boost converter 100 also includes a low-side switch 110 and a high-side switch 112, which are both implemented as FETs. (Note that low-side switch 110 is also referred to as "low-side FET 110," and high-side switch 112 is also referred to as "high-side FET 112.") Referring back to FIG. 1A, low-side switch 110 is coupled between peaking node 109 and a base voltage $V_B$ (e.g., ground), and high-side switch 112 is coupled between peaking node 109 and an output 115, wherein output 115 produces an output voltage $V_o$ 116.

The boost converter illustrated in FIG. 1A includes a number of internal resistances and inductances. The resistances include AC and DC resistances $R_{acr}$ and $R_{dcr}$ of inductor 106, the on-resistance $R_{on}$ of the low-side FET 110, and the on-resistance $R_{pass}$ of the high-side FET 112 in the circuit illustrated in FIG. 1A. (Alternatively to the resistive loss of FET 112 is the forward conduction loss of the diode 120 in the boost converter 103 illustrated in FIG. 1B). The capacitances include gate capacitances and drain-source capacitances for low-side FET 110 and high-side FET 112. There is also a significant capacitance $C_{pk}$ 114 at peaking node 109. $C_{pk}$ is not a separate capacitance, but instead represents an effective total capacitance for AC signals of node 109 with respect to AC ground. In essence, it is the "output capacitance" of FETs 110 and 112 in parallel. (Similarly, in FIG. 1B, $C_{pk}$ is the parallel combination of FET 110's output capacitance, and diode 120's reverse-bias capacitance.) Note that capacitance $C_{pk}$ 114 is subject to the largest voltage swing in the boost converter 100.

Boost converter 100 additionally includes a controller 118 which uses control signals 117 and 111 to control low-side switch 110 and high-side switch 112, respectively. Controller 118 cycles low-side switch 110 (and high-side switch 112) between on and off states with a cycle time $T_{cycle}$. When low-side switch 110 is on, current can flow from inductor 106 and through low-side switch 110 to $V_B$. In contrast, when low-side switch 110 is off and the high-side switch is on, current can flow from inductor 106 through the high-side switch 112 to output 115.

Moreover, when low-side switch 110 is off, controller 118 waits to turn on low-side switch 110 until the inductor current $I_L$ decreases from a peak current $I_{pk}$ to zero and becomes negative. Note that this negative inductor current resonantly transfers energy into the inductor 106 and the input capacitance 104, wherein at least some of the resonantly discharged power is recovered after the low-side switch is turned back on.

Figure 1B:
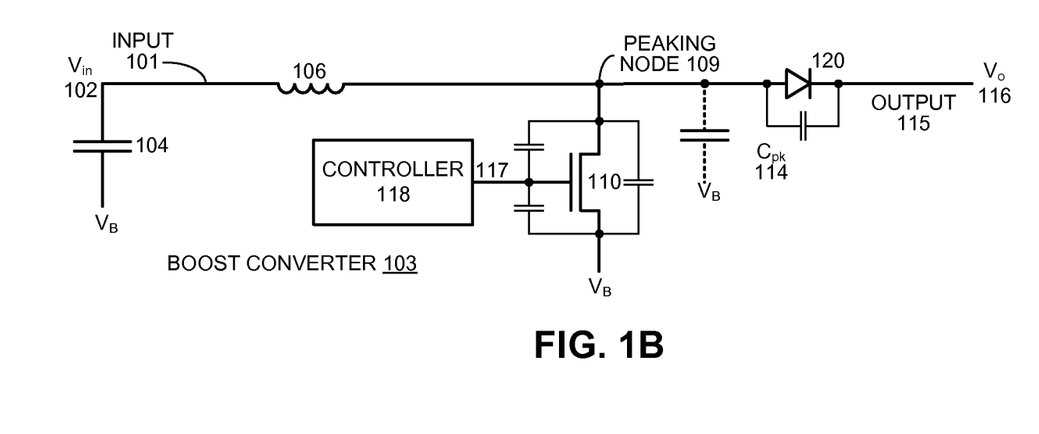
FIG. 1B presents a circuit diagram illustrating a boost converter that uses a diode to implement the high-side switch in accordance with the disclosed embodiments.

FIG. 1B presents a circuit diagram illustrating another implementation for a boost converter 103 that uses a diode 120 (instead of a FET) to implement the high-side switch in accordance with the disclosed embodiments. This boost circuit is the same as the boost circuit illustrated in FIG. 1A, except that diode 120 is used in place of FET 112. Note that diode 120 does not need a control signal from controller 118, because diode 120 will automatically conduct whenever the voltage at peaking node 109 reaches $V_o + V_{drop}$.

Referring to FIGS. 1A and 1B, there are numerous contributors to power dissipation in boost converters. Conduction losses arise from the AC and DC resistances $R_{acr}$ and $R_{dcr}$ of the inductor 106, the on-resistance $R_{on}$ of low-side FET 110, and the on-resistance $R_{pass}$ of high-side FET 112 in the boost converter illustrated in FIG. 1A (or alternatively the forward conduction loss of diode 120 in the boost converter illustrated in FIG. 1B). Switching losses result from charging and discharging the gate capacitances of low-side FET 110 and high-side FET 112, and also the charging and discharging $C_{pk}$. As mentioned above, $C_{pk}$ has the largest voltage swing in the boost converter circuit.

The above-described conduction and switching losses may be collectively minimized based on a detailed understanding of the application load requirements combined with the cost, area, and volumetric constraints of the implementation. For example, conduction loss due to the inductor's DC resistance decreases as the wire gauge decreases. Moreover, the frequency and amplitude of the inductor-current ripple determines the inductor's AC conduction loss. Also, increasing the inductance value decreases current ripple. However, increasing inductance without increasing volume requires increasing the wire gauge, and thus increasing the DC conduction loss.

A preferred operating point for minimizing switching losses is the boundary between "continuous conduction mode" (CCM) and "discontinuous conduction mode" (DCM), which is referred to as "boundary conduction mode" (BCM). Note that the triangular inductor-current waveform completely fills the switching cycle time at BCM. For shorter cycle times, a continuous current flows through inductor 106. For longer cycle times, there are gaps where no current flows through inductor 106. In BCM, the low-side FET 110 is switched on when the inductor current reaches zero amperes. Assuming ideal conversion (100% efficiency), the BCM peak current is $I_{pk} = 2I_o(V_o/V_{in})$, wherein $V_o$ is the output voltage, $I_o$ is the output current, and $V_{in}$ is the input voltage. The low-side FET 110 is switched off when $I_{ds}$ is at peak current. When the low-side FET 110 is switched off, the voltage $V_{ds}$ across the low-side FET rapidly rises from near zero to its maximum value of $V_o$ plus either the diode 120's forward voltage drop or the IR drop across the high-side FET 112. For high efficiency, the drain-to-source voltage across the high-side FET 112 is kept small compared to $V_o$. The approximate switching loss is $(\frac{1}{2})FC_{pk}V_o^2$, wherein F is the switching frequency ($1/T_{cycle}$) and $C_{pk}$ 114 is the total capacitance at peaking node 109. Note that the resonant-recovery technique described in this disclosure can minimize this switching loss.

Exemplary Application

Figure 2:
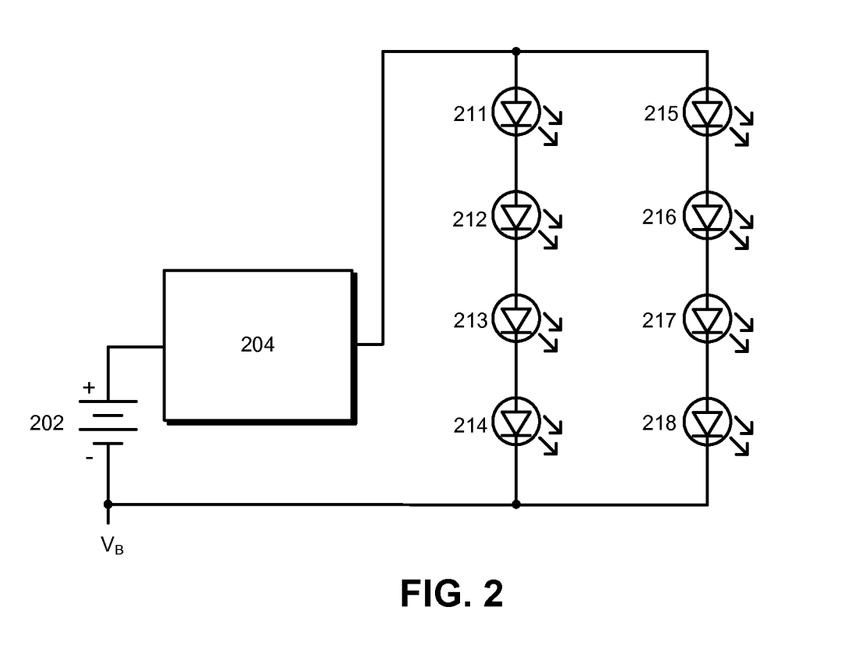
FIG. 2 illustrates an exemplary application for a boost converter in accordance with the disclosed embodiments.

FIG. 2 illustrates an exemplary application for a boost converter in accordance with the disclosed embodiments. In this application, boost converter 204 is used to boost a voltage supplied by a battery 202 to a higher voltage which is used to power two parallel strands of series-connected LEDs; this includes a first strand comprising LEDs 211-214 and a second strand comprising LEDs 215-218. For example, if the voltage drop across each diode is 2.9 volts, about 12 volts is required to drive each series-connected strand of 4 LEDs. These strands of LEDs can be used, for example, to provide a backlight for an LCD display for a portable computing device.

In this exemplary application, assume boost converter 204 needs to boost a typical lithium-ion battery voltage of 3.8V to 12V at a modest current load of 14 mA. Hence, assume $V_{in}$=3.8V, $V_o$=12V, $I_o$=14 mA, $C_{pk}$=35 pF. For these parameters, δ=0.45 radians and $I_{pk}$=88 mA.

Table 1 presents results from simulations which modeled power dissipation associated with inductor 106 and capacitance $C_{pk}$ 114 at peaking node 109. The simulation results in Table 1 were generated for a number of representative inductance values and associated frequencies.

TABLE 1

| inductance | frequency | $P_{dcr}$ | $P_{acr}$ | $P_{pk}$ |
| --- | --- | --- | --- | --- |
| 3.3 μH | 6.9 MHz | 350 μW | 12 mW | 17 mW |
| 4.7 μH | 5.1 MHz | 490 μW | 10 mW | 13 mW |
| 10 μH | 2.5 MHz | 1.0 mW | 5.8 mW | 6.3 mW |
| 22 μH | 1.2 MHz | 2.3 mW | 3.6 mW | 3.0 mW |
| 33 μH | 820 KHz | 3.5 mW | 2.5 mW | 2.1 mW |
| 47 μH | 580 KHz | 4.9 mW | 2.0 mW | 1.5 mW |

The simulation results in Table 1 indicate that as the inductor's DC and AC losses are brought into balance, the switching loss at peaking node 109 dominates. Note that the resonant-recovery techniques described in this disclosure can reduce this switching by possibly as much as an order of magnitude.

Timing Diagram

Figure 3:
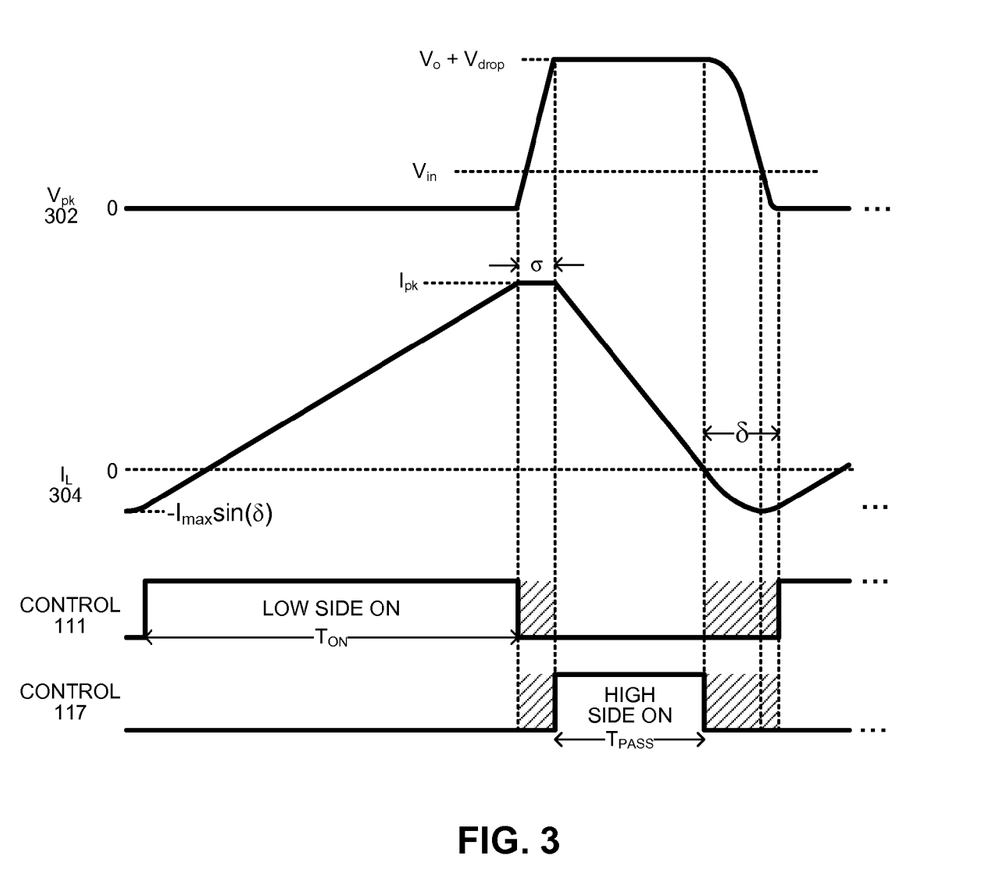
FIG. 3 presents a timing diagram for the boost converter illustrated in FIG. 1A in accordance with the disclosed embodiments.
Figure 5:
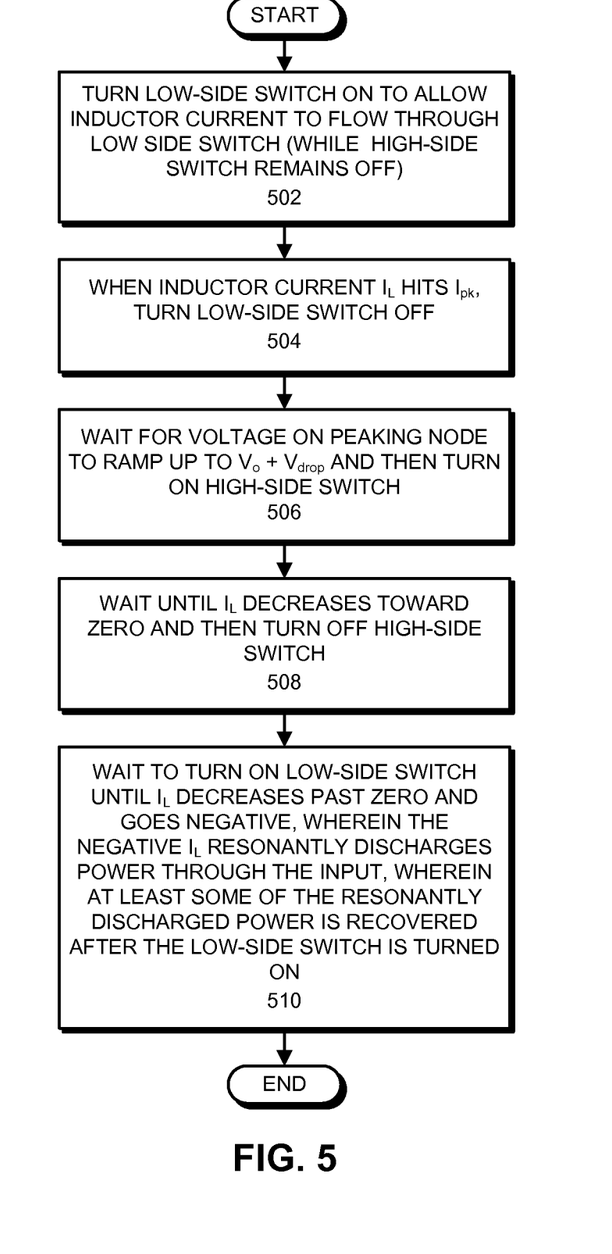
FIG. 5 presents a flow chart illustrating the operations involved in controlling the boost converter in accordance with the disclosed embodiments.

FIG. 3 presents a timing diagram for boost converter 100 illustrated in FIG. 1A, and an associated flow chart appears in FIG. 5. Referring to both FIGS. 3 and 5, at the beginning of a conversion cycle, controller 118 uses control signal 111 to turn on low-side switch 110 to allow inductor current $I_L$ 304 to flow through low-side switch 110 to the base voltage $V_B$ (step 502). (At the same time, controller 118 maintains control signal 117 at a low level which keeps high-side switch 112 turned off.) Next, after inductor current $I_L$ hits $I_{pk}$, controller 118 turns low-side switch 110 off (step 504). This causes the inductor current which was flowing through low-side switch 110 to instead flow into peaking node 109. However, because high-side switch 112 remains off, the inductor current causes the voltage $V_{pk}$ at peaking node 109 to rise rapidly.

Next, controller 118 waits a period of time σ for the voltage $V_{pk}$ 302 at peaking node 109 to ramp up to $V_o+V_{drop}$ and then turns on high-side switch 112 (step 506). (In the embodiment illustrated in FIG. 1B, when $V_{pk}$ equals $V_o+V_{drop}$, diode 120 automatically switches on.) This causes $I_L$ to flow to output 115. Note that $V_{pk}$ remains at $V_o+V_{drop}$ as energy transfers from inductor 106 to output 115. Next, controller 118 waits until $V_{pk}$ decreases to approximately zero volts (or alternatively, a minimum value) and then turns off high-side switch 112 (step 508).

Finally, controller 118 waits to turn on low-side switch 110 (for a period of time δ) until $I_L$ decreases to approximately zero amps and then goes negative. This negative $I_L$ resonantly discharges power through input 101, wherein at least some of the resonantly discharged power is recovered after the low-side switch 110 is turned on (step 510).

The total cycle time for the process illustrated in FIG. 3 can be calculated as follows. In terms of angular time, the interval from $V_o$ to $V_{in}$, is one-quarter of the full resonant cycle or π/2 radians. The interval from $V_{in}$ to 0 is $$\sin\delta = \frac{V_{in}}{V_o - V_{in}}.$$

The total time to resonantly discharge from $V_o$ to zero in absolute time is $$\left(\frac{\pi}{2} + \delta\right)\sqrt{LC_{pk}}.$$

When the voltage across inductor 106 equals zero, $I_L$ is a maximum, $$I_{max} = \sqrt{\frac{C_{pk}}{L}}(V_o - V_{in}).$$

The current when the low-side FET 110 turns on equals $$-I_{max}\sin\delta.$$

Note that the resonant-recovery technique requires a lower switching frequency but a higher peak current $I_{pk}$ than pure BCM. It is DCM in time but BCM in peak current. The key parameter is the phase angle, δ, for the next excursion of the inductor current. For the case of a synchronous boost, the idea is simply to insert a delay of π/2+δ between when the high-side FET 112 turns off and the low-side FET 110 turns on. Hence, the total cycle time is $$T_{cycle} = T_{ON} + T_{PASS} + \left(\delta + \frac{\pi}{2}\right)\sqrt{LC_{pk}}.$$

$T_{ON}$ is the time interval when the low-side FET 110 is turned on, and $T_{PASS}$ is the time interval when the high-side FET 112 is turned on. When the low-side FET 110 is turned on, the following holds for the change in current, $$\frac{V_{in}}{L}T_{ON} = I_{pk} + I_{max}\sin\delta.$$

In contrast, when the high-side FET 112 is turned on, the current change is $$\frac{V_o - V_{in}}{L} T_{PASS} = I_{pk}.$$

By combining these equations, the cycle time $T_{cycle}$ is governed by the choice of L for application-specific values of $V_{in}$, $V_o$, and $I_o$, $$T_{cycle} = \left(\frac{I_{pk} + I_{max}\sin\delta}{V_{in}} + \frac{I_{pk}}{V_o - V_{in}}\right)L + \left(\frac{\pi}{2} + \delta\right)\sqrt{LC_{pk}}.$$

Note that to maintain the same output current as for pure BCM, the value of $I_{pk}$ has to increase. What the average output current is depends on the specifics of the high and low-side parasitic capacitances, because some of the reversing current is pulled from the output to charge up the high-side switch capacitance, and the rest is pulled from the low-side FET to discharge it's capacitance. In one extreme, the high side switch has no capacitance, and $$I_0 = \frac{I_{pk}}{2} \frac{T_{PASS}}{T_{cycle}}$$

and the two time periods are themselves functions of $I_{pk}$. Hence, $I_{pk}$ can be selected to achieve the desired output current.

Boundary Conditions

Figure 4:
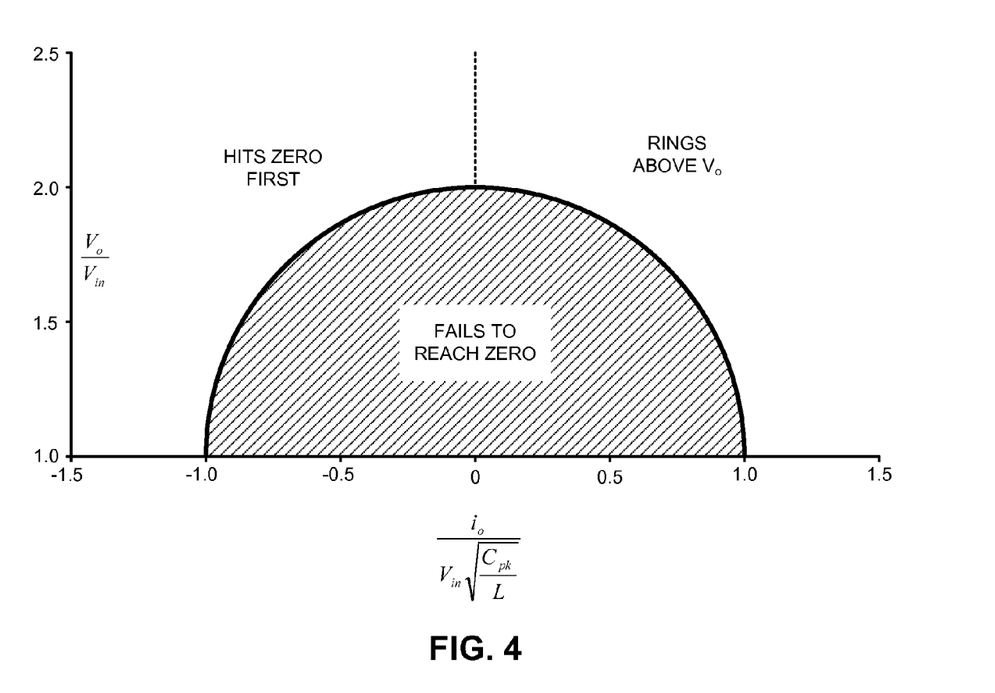
FIG. 4 presents a graph illustrating boundary conditions where the voltage on the peaking node will reach zero during the resonant-recovery period in accordance with the disclosed embodiments.

FIG. 4 presents a graph illustrating boundary conditions where the voltage on the peaking node will reach zero during the resonant-recovery period in accordance with the disclosed embodiments. The condition that the "peaking node" voltage reach zero during the resonant energy recovery period can be expressed as a condition on the energy stored in the inductor 106 and the parasitic peaking node capacitance $C_{pk}$. Note that the equilibrium voltage for $C_{pk}$ is $V_{in}$, which would be reached if the recovery period were extended to allow all oscillations to decay. We can take this condition as the zero of potential energy, because charge is exchanged with the input supply at $V_{in}$. The energy stored in the capacitance is $$U_{cap} = \frac{1}{2} C_{pk} (V_{pk} - V_{in})^2.$$

Note that this energy is zero for $V_{pk}=V_{in}$ and $\frac{1}{2}C_{pk}(V_{in})^2$ for $V_{pk}=0$. The energy stored in inductor 106 in terms of its current $I_0$ at the beginning of the period is $$U_{ind} = \frac{1}{2} L (I_0)^2$$

For the voltage across $C_{pk}$ to reach zero volts, the total energy must satisfy, $$U = \frac{1}{2} L (I_0)^2 + \frac{1}{2} C_{pk} (V_o - V_{in})^2 \geq \frac{1}{2} C_{pk} (V_{in})^2.$$

The desired region satisfies $$\left[\frac{I_0}{V_{in}\sqrt{C_{pk}/L}}\right]^2 + \left[\frac{V_{in}}{V_o} - 1\right]^2 \geq 1.$$

As shown in FIG. 4, the boundary is a semicircle in the boost-factor versus (scaled) current plane. The voltage will cross zero for all points outside of the semicircle. Beginning the resonant-recovery period with a negative current can be useful because it reduces the time it takes to drain $C_{pk}$. Beginning with a positive current of equal magnitude will cause $C_{pk}$ to ring up to a higher voltage before oscillating back to or through zero. This not only takes more time, but also will not work if the high-side diode (or the body diode of a high-side FET) conducts as a result.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A power converter, comprising:
   an inductor with an inductance of L coupled between an input, which receives an input voltage $V_{in}$, and a peaking node, wherein the total voltage at the peaking node is $V_{pk}$;
   a low-side switch coupled between the peaking node and a base voltage;
   a high-side switch coupled between the peaking node and an output, which produces an output voltage $V_o$ and an output current $I_o$; and
   a controller which cycles the low-side switch between on and off states with a cycle time $T_{cycle}$, wherein during the on state, current can flow from the inductor through the low-side switch, and wherein during the off state, current can flow from the inductor through the high-side switch to the output;
   wherein during the off state, the controller waits to turn on the low-side switch until the inductor current $I_L$ decreases from a peak current $I_{pk}$ to zero and then goes negative, wherein the negative inductor current resonantly discharges power through the input, wherein at least some of the resonantly discharged power is recovered after the low-side switch is turned on;
   wherein the controller turns on the low-side switch before $I_L$ returns to zero and when $V_{pk}$ drops to zero; and
   wherein during the on state, the controller waits to turn off the low-side switch until the inductor current $I_L$ reaches $I_{pk}=2I_o(V_o/V_{in})$.

2. The power converter of claim 1, wherein the controller waits to turn on the low-side switch until a voltage $V_{pk}$ at the peaking node is as close as possible to zero.

3. The power converter of claim 1, wherein the low-side switch is a transistor.

4. The power converter of claim 1, wherein the high-side switch is a transistor.

5. The power converter of claim 4,
   wherein after the controller turns off the low-side switch, the controller waits for a non-overlapping time interval to transpire before turning on the high-side switch, wherein the non-overlapping time interval allows a voltage on the peaking node to ramp up to $V_o+V_{drop}$, wherein $V_{drop}$ is a voltage drop through the high-side switch; and wherein the controller waits until $I_L$ decreases toward zero before turning off the high-side switch.

6. The power converter of claim 1, wherein the high-side switch is a diode with a forward voltage drop $V_{drop}$, wherein the diode turns on when a voltage on the peaking node reaches $V_o+V_{drop}$.

7. The power converter of claim 1,
wherein a time interval between when the high-side switch is turned off and the low-side switch is turned on is a resonant-recovery time $t_{rrc}$; and
wherein the controller is configured to dynamically update the cycle time $T_{cycle}$ and $t_{rrc}$ based on changing values for an output current $I_o$ and $V_{in}$.

8. The power converter of claim 1, wherein the input is coupled to a battery.

9. The power converter of claim 1, further comprising a capacitive filter coupled to the output to reduce output voltage ripple.

10. A method for operating a power converter, comprising:
using the power converter to convert an input voltage to an output voltage, wherein the power converter comprises: an inductor with an inductance of L coupled between an input which receives an input voltage $V_{in}$, and a peaking node, wherein the voltage at the peaking node is $V_{pk}$; a low-side switch coupled between the peaking node and a base voltage; and a high-side switch coupled between the peaking node and an output, which produces an output voltage $V_o$ and an output current $I_o$;
wherein while converting the input voltage to the output voltage the method comprises cycling the low-side switch between on and off states with a cycle time $T_{cycle}$, wherein during the on state, current can flow from the inductor through the low-side switch, and wherein during the off state, current can flow from the inductor through the high-side switch to the output; and
wherein during the off state, the method comprises waiting to turn on the low-side switch until the inductor current $I_L$ decreases from a peak current $I_{pk}$ to zero and then goes negative, wherein the negative inductor current resonantly discharges power through the input, wherein at least some of the resonantly discharged power is recovered after the low-side switch is turned on;
wherein the controller turns on the low-side switch before $I_L$ returns to zero and when $V_{pk}$ drops to zero; and
wherein during the on state, waiting to turn off the low-side switch until the inductor current $I_L$ reaches $I_{pk}=2I_o(V_o/V_{in})$.

11. The method of claim 10, wherein waiting to turn on the low-side switch involves waiting until a voltage $V_{pk}$ at the peaking node is as close as possible to zero.

12. The method of claim 10, wherein the low-side switch is a transistor.

13. The method of claim 10, wherein the high-side switch is a transistor.

14. The method of claim 13,
wherein after the low-side switch is turned off, the method comprises waiting for a non-overlapping time interval to transpire before turning on the high-side switch, wherein the non-overlapping time interval allows a voltage on the peaking node to ramp up to $V_o+V_{drop}$, wherein $V_{drop}$ is a voltage drop through the high-side switch; and wherein the method further comprises waiting until $I_L$ decreases toward zero before turning off the high-side switch.

15. The method of claim 10, wherein the high-side switch is a diode with a forward voltage drop $V_{drop}$, wherein the diode turns on when a voltage on the peaking node reaches $V_o+V_{drop}$.

16. The method of claim 10,
wherein a time interval between when the high-side switch is turned off and the low-side switch is turned on is a resonant-recovery time $t_{rrc}$; and
wherein the method further comprises dynamically updating the cycle time $T_{cycle}$ and $t_{rrc}$ based on changing values for an output current $I_o$ and $V_{in}$.

17. A power supply, comprising:
a battery; and
a power converter coupled to the battery, wherein the power converter comprises,
an inductor with an inductance of L coupled between an input, which receives an input voltage $V_{in}$ from the battery, and a peaking node, wherein the voltage at the peaking node is $V_{pk}$,
a low-side switch coupled between the peaking node and a base voltage,
a high-side switch coupled between the peaking node and an output, which produces an output voltage $V_o$ and an output current $I_o$, and
a controller which cycles the low-side switch between on and off states with a cycle time $T_{cycle}$, wherein during the on state, current can flow from the inductor through the low-side switch, and wherein during the off state, current can flow from the inductor through the high-side switch to the output, wherein during the off state, the controller waits to turn on the low-side switch until the inductor current $I_L$ decreases from a peak current $I_{pk}$ to zero and then goes negative, wherein the negative inductor current resonantly discharges power through the input, wherein at least some of the resonantly discharged power is recovered after the low-side switch is turned on;
wherein the controller turns on the low-side switch before $I_L$ returns to zero and when $V_{pk}$ drops to zero; and
wherein during the on state, the controller waits to turn off the low-side switch until the inductor current $I_L$ reaches $I_{pk}=2I_o(V_o/V_{in})$.

18. The power supply of claim 17, wherein the controller waits to turn on the low-side switch until a voltage $V_{pk}$ at the peaking node is as close as possible to zero.

19. The power supply of claim 17, wherein the low-side switch is a transistor.

20. The power supply of claim 17, wherein the high-side switch is a transistor.

21. The power supply of claim 20,
wherein after the controller turns off the low-side switch, the controller waits for a non-overlapping time interval to transpire before turning on the high-side switch, wherein the non-overlapping time interval allows a voltage on the peaking node to ramp up to $V_o+V_{drop}$, wherein $V_{drop}$ is a voltage drop through the high-side switch; and
wherein the controller waits until $I_L$ decreases toward zero before turning off the high-side switch.

22. The power supply of claim 17, wherein the high-side switch is a diode with a forward voltage drop $V_{drop}$, wherein the diode turns on when a voltage on the peaking node reaches $V_o+V_{drop}$.

23. The power supply of claim 17,
wherein a time interval between when the high-side switch is turned off and the low-side switch is turned on is a resonant-recovery time $t_{rrc}$; and
wherein the controller is configured to dynamically update the cycle time $T_{cycle}$ and $t_{rrc}$ based on changing values for an output current $I_o$ and $V_{in}$.

24. A non-transitory computer-readable storage medium storing instructions that when executed by a controller cause the controller to perform a method for operating a power converter, the method comprising:
controlling the power converter to convert an input voltage to an output voltage, wherein the power converter comprises: an inductor with an inductance of L coupled between an input, which receives an input voltage $V_{in}$, and a peaking node, the voltage at the peaking node is $V_{pk}$; a low-side switch coupled between the peaking node and a base voltage; and a high-side switch coupled between the peaking node and an output, which produces an output voltage $V_o$ and an output current $I_o$;
wherein controlling the power converter involves cycling the low-side switch between on and off states with a cycle time $T_{cycle}$, wherein during the on state, current can flow from the inductor through the low-side switch, and wherein during the off state, current can flow from the inductor through the high-side switch to the output; and
wherein during the off state, controlling the power converter involves waiting to turn on the low-side switch until the inductor current $I_L$ decreases from a peak current $I_{pk}$ to zero and then goes negative, wherein the negative inductor current resonantly discharges power through the input, wherein at least some of the resonantly discharged power is recovered after the low-side switch is turned on;
wherein the controller turns on the low-side switch before $I_L$ returns to zero and when $V_{pk}$ drops to zero; and
wherein during the on state, the controller waits to turn off the low-side switch until the inductor current $I_L$ reaches $I_{pk}=2I_o(V_o/V_{in})$.

* * * * *